Patented Jan. 14, 1936

2,027,905

UNITED STATES PATENT OFFICE 2,027,905

RECTAL NARCOTIC

Erich Goth, Wuppertal-Elberfeld, Germany, assignor to Winthrop Chemical Company, Inc., New York, N. Y., a corporation of New York No Drawing. Application October 29, 1931, Serial No. 571,939. In Germany October 30, 1930

17 Claims. (Cl. 167—52)

The present invention relates to new liquid preparations of tribromoethylalcohol, said preparations comprising tribromoethylalcohol and an amide like compound.

When using tribromoethylalcohol as an anesthetic or rectal narcotic an exact dosing of the same will be of great importance. Hitherto for the purposes of liquefaction of tribromoethylalcohol formamide and liquid monohydric secondary or tertiary alcohols were used. When using these liquid preparations of tribromoethylalcohol in the surgical practice it has proved of remarkable importance that the liquefying medium is adjusted to the peculiarity of each individual case depending on the constitution and the state of organism to which the tribromoethylalcohol is to be applied. The medicinal practice, therefore, necessitates to place at the surgeons' disposal a larger assortment of liquid preparations of tribromoethylalcohol which are stable to light and heating and are capable of complying with the requirements of the practice, than known up to date.

In accordance with my present invention new anhydrous liquid preparations of tribromoethylalcohol are obtainable by treating tribromoethylalcohol with an amide like compound of the group consisting of amides of the lower aliphatic carboxylic acids containing at least 2 carbon atoms, mono- or dialkylated amides of the lower aliphatic carboxylic acids, esters of the carbamic acid and N-alkylated substitution products thereof, urea, alkylated ureas. In these amide like compounds the acid amide grouping may be present in an open or cyclic chain.

Particularly suitable for the purposes specified have proved, for example, acetamide, propionic amide, N-methyl- and N-ethyl-acetamide, N-dimethyl- or N-diethyl-acetamide, sarcosine anhydride, the methyl ester of carbamic acid, the ethyl ester of the carbamic acid, methyl ester of N-mono- or dimethyl carbamic acid, the ethyl- or propyl ester of N-mono- or N-dimethyl carbamic acid, the 2-oxazolidone of the formula

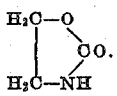

tetramethyl urea, which amide-like compounds are used in such quantity that the mixture is liquid at room temperature, said liquid preparations being stable to light and heating.

The liquefying media used in my new preparations, in contradistinction with the hitherto known liquefying agents, are—in most cases—solid substances.

Since the narcotic compositions as they are known so far would not sufficiently comply with the various requirements of the medicinal practice, a further advantage is to be seen in the fact that the plurality of my new liquefying agents can be applied for the most various purposes. It may be mentioned that the liquefying media used in my new liquid preparations of tribromoethylalcohol, may be used as such or in admixture with one another or with the already known liquefying agents.

In some cases the liquefied state can be attained in such a manner that mixtures of such agents are employed which, when used alone, have no liquefying effect on the tribromoethylalcohol, but in admixture with each other or after addition of still another liquefying agent provide a completely liquid preparation.

Of course the liquefying media used in my new preparations neither as such nor the mixtures show any obnoxious effects on the patient when used in the surgical practice.

My new preparations are more or less soluble in water. The amount of liquefying agent to be added to the tribromoethylalcohol may vary within wide limits but is advantageously chosen in such a manner that the mixture is liquid at room temperature in any climate, and furthermore exerts the desired pharmacological action. In the most cases amounts of about 15–100% of the liquefying agent of the kind above referred to, calculated on the amount of tribromoethylalcohol, will be suitable, but it may be mentioned that also larger or smaller quantities may in some cases yield better results and fall within the scope of my invention.

The following examples illustrate my invention without restricting it thereto, the parts being by weight:

*Example 1.*—15 parts of acetamide, 18 parts of methylacetamide and 142 parts of tribromoethylalcohol are mixed, while stirring and gently heating. A product which is liquid at room temperature is obtained. When dissolving the liquid thus obtained in water a clear solution suitable for rectal narcotic purposes results.

*Example 2.*—31 parts of carbamic acid methyl ester, 45 parts of carbamic acid ethyl ester and 142 parts of tribromoethylalcohol are mixed, while stirring. A readily mobile liquid is produced, from which no crystals are deposited even below 0° C.

Instead of carbamic acid ethyl ester the same quantity of 2-oxazolidone may be used. The liquid preparation may be used with advantage for pharmaceutical purposes.

*Example 3.*—To 142 parts of tribromoethylalcohol 52 parts of the methyl ester of dimethyl carbamic acid are added. The resulting clear solution does not deposit crystals even on cooling below 0° C.

*Example 4.*—To 142 parts of tribromoethylalcolhol 30 parts of tetramethyl urea are added. A clear solution results.

*Example 5.*—To 142 parts of tribromoethylalcohol a mixture of 30 parts of tetramethyl urea and 20 parts of isopropylic alcohol is added. The resulting liquid is stable to light and heating.

*Example 6.*—100 parts of tribromoethylalcohol are mixed with 8 parts of methylacetamide, 15 parts of sarcosine anhydride and 15 parts of monomethyl ether of glycol. A clear liquid results.

I claim:—

1. An anhydrous composition of matter which is liquid at room temperature comprising tribromoethylalcohol and an amide like compound of the group consisting of amides of the lower carboxylic acids containing at least two carbon atoms, mono- or dialkylated amides of the lower aliphatic carboxylic acids, esters of the carbamic acid and N-alkylated substitution products thereof, urea and alkylated ureas, the acid amide grouping being present in an open or cyclic chain, said composition of matter being stable to light and heating and being suitable for pharmaceutical purposes.

2. An anhydrous composition of matter which is liquid at room temperature comprising tribromoethylalcohol and an amide of the lower carboxylic acids containing at least two carbon atoms the nitrogen atom of which amide may be substituted by an alkyl group, the acid amide grouping being present in an open or cyclic chain, said composition of matter being stable to light and heating and being suitable for pharmaceutical purposes.

3. An anhydrous composition of matter which is liquid at room temperature comprising tribromoethylalcohol and an amide of the lower aliphatic carboxylic acids containing at least two carbon atoms the nitrogen atom of which amide may be substituted by an alkyl group, said composition of matter being stable to light and heating and being suitable for pharmaceutical purposes.

4. An anhydrous composition of matter which is liquid at room temperature comprising tribromoethylalcohol and acetamide, said composition of matter being stable to light and heating and being suitable for pharmaceutical purposes.

5. An anhydrous composition of matter which is liquid at room temperature comprising tribromoethylalcohol in admixture with acetamide and an alkyl acetamide, said composition of matter being stable to light and heating and being suitable for pharmaceutical purposes.

6. An anhydrous composition of matter which is liquid at room temperature comprising tribromoethylalcohol in admixture with acetamide and methyl acetamide, said composition of matter being stable to light and heating and being suitable for pharmaceutical purposes.

7. An anhydrous composition of matter comprising 142 parts by weight of tribromoethylalcohol in admixture with 15 parts by weight of acetamide and 18 parts by weight of methyl acetamide, said composition of matter being liquid at room temperature stable to light and heating and being suitable for pharmaceutical purposes.

8. An anhydrous composition of matter which is liquid at room temperature comprising tribromoethylalcohol and an ester of the carbamic acid the nitrogen atom of which may be substituted by an alkyl group, the acid amide grouping being present in an open or cyclic chain, said composition of matter being stable to light and heating and being suitable for pharmaceutical purposes.

9. An anhydrous composition of matter which is liquid at room temperature comprising tribromoethylalcohol and an alkyl ester of the carbamic acid the nitrogen atom of which may be substituted by an alkyl group, said composition of matter being stable to light and heating and being suitable for pharmaceutical purposes.

10. An anhydrous composition of matter which is liquid at room temperature comprising tribromoethylalcohol and the methyl ester of the carbamic acid, the nitrogen atom of which may be substituted by methyl or ethyl, said composition of matter being stable to light and heating and being suitable for pharmaceutical purposes.

11. An anhydrous composition of matter which is liquid at room temperature comprising tribromoethylalcohol and an alkyl ester of the carbamic acid the nitrogen atom of which may be substituted by an alkyl group and a cyclic carbamic acid ester, said composition of matter being stable to light and heating and being suitable for pharmaceutical purposes.

12. An anhydrous composition of matter which is liquid at room temperature comprising tribromoethylalcohol and an alkyl ester of the carbamic acid the nitrogen atom of which may be substituted by an alkyl group and 2-oxazolidone, said composition of matter being stable to light and heating and being suitable for pharmaceutical purposes.

13. An anhydrous composition of matter which is liquid at room temperature comprising tribromoethylalcohol and methyl ester of the carbamic acid and 2-oxazolidone, said composition of matter being stable to light and heating and being suitable for pharmaceutical purposes.

14. An anhydrous composition of matter comprising 142 parts by weight of tribromoethylalcohol in admixture with 31 parts by weight of the methyl ester of the carbamic acid and 45 parts by weight of 2-oxazolidone, said composition of matter being stable to light and heating and being suitable for pharmaceutical purposes.

15. An anhydrous composition of matter which is liquid at room temperature comprising tribromoethylalcohol and an alkyl ester of N-dimethyl carbamic acid, said composition of matter being stable to light and heating and being suitable for pharmaceutical purposes.

16. An anhydrous composition of matter which is liquid at room temperature comprising tribromoethylalcohol and the methyl ester of N-dimethyl carbamic acid, said composition of matter being stable to light and heating and being suitable for pharmaceutical purposes.

17. An anhydrous composition of matter comprising 142 parts by weight of tribromoethylalcohol and 52 parts by weight of the methyl ester of N-dimethyl carbamic acid, said composition of matter being liquid at room temperature stable to light and heating and being suitable for pharmaceutical purposes.

ERICH GOTH.